March 28, 1961    R. BECKADOLPH    2,976,905
PNEUMATIC TIRE
Filed July 1, 1957    2 Sheets-Sheet 1
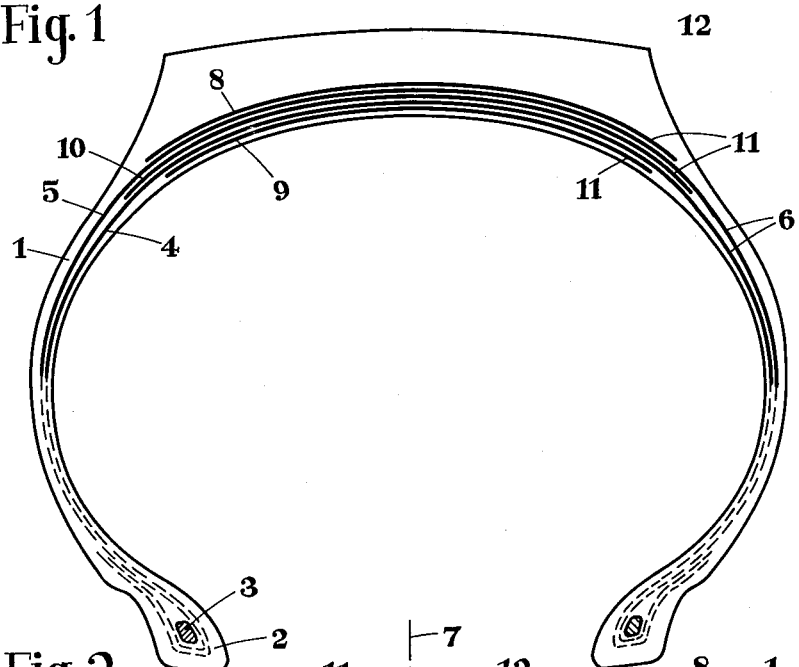
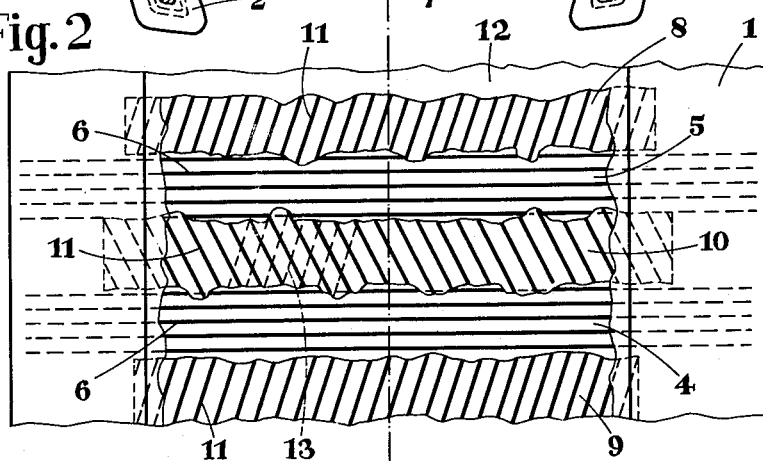
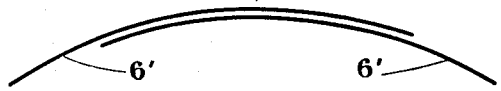
INVENTOR:
Richard Beckadolph
By United States Patent Office 2,976,905
Patented Mar. 28, 1961

2,976,905
PNEUMATIC TIRE

Richard Beckadolph, Hannover, Germany, assignor to Continental Gummi-Werke Aktiengesellschaft, Hannover, Germany Filed July 1, 1957, Ser. No. 668,953
Claims priority, application Germany July 2, 1956
2 Claims. (Cl. 152—354)

The present invention concerns a pneumatic vehicle tire with thread or band-like reinforcements which are anchored in the beads and while being parallel to each other are located in radial planes with regard to the tire, said reinforcements crossing with thread or band-like reinforcements arranged in a plurality of layers in the zenith portion of the tire, while said last mentioned reinforcements in each layer are parallel to each other. Tires which are provided with radially extending reinforcements only have a maximum dynamic softness with the forces acting perpendicular upon the tread area. Such tires, however, lack sufficient lateral stability. In order to overcome this drawback, it has been suggested heretofore to produce the desired lateral stability by additional layers of reinforcements crossing each other so as to form a band resistant against lateral forces. More specifically, in conformity with one of the heretofore known tires, the additional layers are made of pull and pressure-resistant threads or wires which are so arranged that they form triangles. Experience has shown that while such tires have sufficient resistance against lateral forces, in spite of the radial reinforcement inserts they have an insufficient dynamic softness.

It is, therefore, an object of the present invention to provide a tire which will have a high dynamic softness as well as sufficient lateral stability while also being characterized by a long life.

It is another object of this invention to provide a tire of the type set forth in the preceding paragraph, which will be relatively simple in construction and can easily be produced.

These and other objects and advantages of the invention will appear more clearly from the following specification in connection with the accompanying drawings, in which:

Fig. 1 represents a radial partial section through a pneumatic tire according to the invention.

Fig. 2 is a top view of the tire according to Fig. 1.

Fig. 3 shows a detail of the tire according to the invention.

General arrangement

Figure 4:
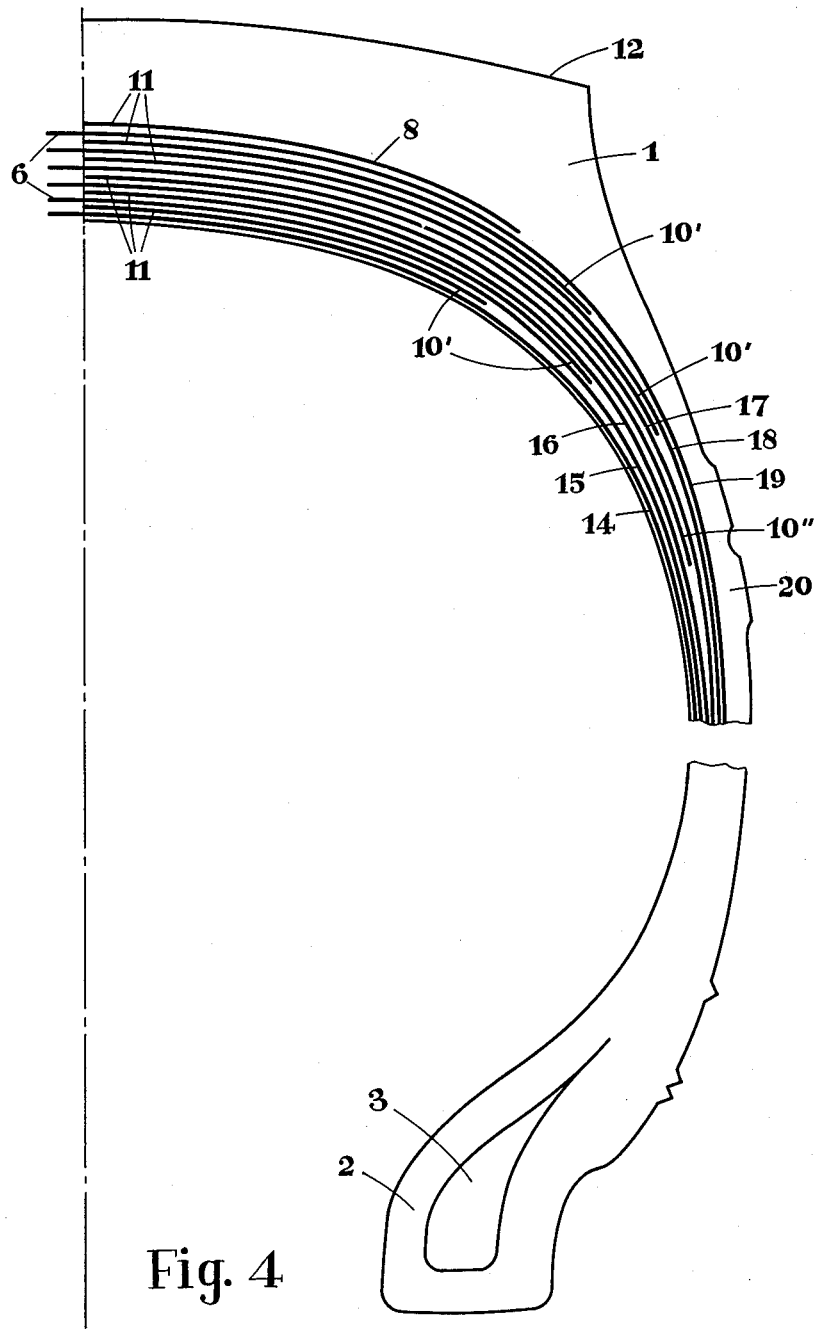
Fig. 4 is a radial partial section through a tire according to the invention which is provided only with reinforcements with elastic stress.

According to the present invention, between each two adjacent layers of reinforcements which are anchored in the beads and are under pulling stress, there is provided one layer with reinforcements forming with the circumferential line of the tire an angle, preferably from 18 to 36°.

The invention is based on applicant's finding that a laterally stable circumferential band which is spaced from the radial reinforcements prevents the desired dynamic softness effect, and that the desired dynamic softness can be obtained only when the radial reinforcements and the reinforcements inclined thereto are within the zenith portion of the tires adapted to each other and supplement each other. Those reinforcements which in conformity with the invention are located between the radial reinforcements and extend at an angle thereto prevent deformations of the radial inserts so that the latter under the influence of lateral forces as they occur for instance when passing through a curve, cannot leave their predetermined position, for instance by deflecting.

The additional arrangement of the inclined reinforcements thus makes it possible that those portions of the radial threads or the like which are anyhow located in the zenith portion of the tire, be made a component, i.e. an essential component of the inserts showing about lateral stability. The radial reinforcements are anyhow under a pulling stress brought about by the tire inner pressure so that special steps for increasing the pressure resistance in longitudinal direction of the threads, for instance additional reinforcements of the threads by bandages or the like will be superfluous. The reduction in the layers within the zenith portion of the tire is not the least reason for the fact that the tire will not become unduly hard and that the radial reinforcements in the lateral portion of the tires will maintain a maximum dynamic softness.

Structural arrangement

The tire 1 which consists primarily of rubber or rubber-like material is provided with annular steel cores 3 which are located in the beads 2 and serve for anchoring the layers 4 and 5 extending from bead to bead. According to the showing of Fig. 2, the layers 4 and 5 consist of thread or band-like reinforcements 6 which are so embedded in the tires that they extend radially or substantially in radial direction with regard to the tire and form with the circumferential tire line 7 angles of approximately 60 to 90° preferably angles of 80 to 90°.

Above the layer 5 there is provided a further layer 8 and below the layer 4 there is located a layer 9. In connection with the present invention it is of great importance that an additional layer 10 is located between the reinforcements 6 of layers 4 and 5 which are subjected to pulling stress. The reinforcements 11 which form the layers 8, 9 and 10 and are arranged in cord position and below the tread 12 partially extend into the lateral walls of the tire and with the circumferential direction 7 form angles of preferably 18 to 36°. The reinforcements 11 may be so arranged that they cross each other in conformity with Fig. 2. However, it is also possible so to arrange the reinforcements 11 of the intermediate layer 10 that the reinforcements of all layers extend in one direction or substantially in one direction, which means that the reinforcements 11 of the insert 10 are for this purpose arranged in the direction of the dash lines 13.

The invention may also be materialized by radial reinforcements 6' which within the range of the layers 8, 9 and 10 do not extend all the way but overlap each other so that the elements 6' are held together within the overlapping range of said elemtnt 6' by means of the rubber material surrounding the same. The connection thus produced brings about that also the reinforcements 6' are under pulling stress in view of the interior tire pressure.

The reinforcements forming the layers 8, 9 and 10 are expediently arranged closely to each other preferably so closely that they almost touch each other whereby in combination with the layers 4 and 5 favorable rings are formed which are pull-resistant in circumferential direction.

The object according to the present invention may also be materialized by employing only reinforcements with elastic tension (disregarding the steel cores 3) which would include reinforcements of textiles for instance rayon or other synthetic materials. Thus steel reinforcements which frequently are difficult to process will not be employed. Such a tire is illustrated in Fig. 4.

As will be seen from Fig. 4, between the layers 14, 15, 16, 17, 18 and 19 with the radially arranged reinforcements 6 anchored in the cores 3, intermediate layers 10' and 10" are provided which, if desired, may also be duplicated. The intermediate layer 10" extends into the lateral wall 20 of the tire, and the layers 10' above and below the layer 10" are stepped in order to obtain particularly favorable stress conditions during the distortion of the tire.

It is, of course, to be understood that the present invention is, by no means, limited to the particular construction shown in the drawings but also comprises any modifications within the scope of the appended claims.

What I claim is:

1. In combination in a belted tire having beads and a tread area: a plurality of plies of substantially parallel cords located in planes passing through the axis of rotation of said tire and having their cords under prepulling stress anchored to said beads, and a plurality of layers of annular belt-shaped reinforcements interleaved with said plies of cords in such a way that between each two adjacent plies of cords there is located one layer only of said annular belt-shaped reinforcements, all of said belt-shaped layers of reinforcements being in close contact with the respective adjacent plies of cords, said annular belt-shaped reinforcements being located in the zenith portion of said tire and forming an angle with the circumferential direction of rotation of said tire and extending substantially over the width of said tread area.

2. A pneumatic vehicle tire according to claim 1, in which said belt-shaped reinforcements are staggered as to width starting from the uppermost belt-shaped layer being the narrowest one and fully located within the width of the tread area, the widest one of said belt-shaped reinforcements extending only slightly into the side walls of said tire.

References Cited in the file of this patent

UNITED STATES PATENTS

| | | |
|---|---|---|
| 2,186,178 | Shoemaker | Jan. 9, 1940 |
| 2,348,350 | McKelvey | May 9, 1944 |
| 2,930,425 | Lugli et al. | Mar. 29, 1960 |

FOREIGN PATENTS

| | | |
|---|---|---|
| 378,141 | France | Aug. 1, 1907 |
| 490,304 | Canada | Feb. 3, 1953 |
| 698,915 | Great Britain | Oct. 28, 1953 |
| 523,034 | Italy | Apr. 13, 1955 |